(12) United States Patent
Beeler et al.

(10) Patent No.: US 11,196,664 B2
(45) Date of Patent: Dec. 7, 2021

(54) MULTI-PATH MESSAGE DISTRIBUTION AND MESSAGE REASSEMBLY FOR LARGE DATA FLOW USING FORWARD ERROR CORRECTION WITH HIGH-PERFORMANCE COMPUTING (HPC)

(71) Applicant: Envistacom, LLC, Atlanta, GA (US)

(72) Inventors: Michael Beeler, Jefferson, MD (US); Kasra Toyserkani, Rockville, MD (US); Cris Mamaril, Mesa, AZ (US)

(73) Assignee: Envistacom, LLC, Atlanta, GA (US)

( * ) Notice: Subject to any disclaimer, the term of this patent is extended or adjusted under 35 U.S.C. 154(b) by 141 days.

(21) Appl. No.: 16/601,892

(22) Filed: Oct. 15, 2019

(65) Prior Publication Data
US 2021/0083966 A1    Mar. 18, 2021

Related U.S. Application Data

(60) Provisional application No. 62/900,886, filed on Sep. 16, 2019.

(51) Int. Cl.
*H04L 12/28* (2006.01)
*H04L 12/707* (2013.01)
(Continued)

(52) U.S. Cl.
CPC ............ *H04L 45/24* (2013.01); *H04L 1/0041* (2013.01); *H04L 1/0045* (2013.01); *H04L 69/324* (2013.01)

(58) Field of Classification Search
CPC ..... H04L 45/24; H04L 69/324; H04L 1/0045; H04L 1/0041; H04L 69/14; H04L 45/00;
(Continued)

(56) References Cited

U.S. PATENT DOCUMENTS 8,089,993 B2   1/2012 Wei et al.
8,542,755 B2   9/2013 Kopmeiners
(Continued)

FOREIGN PATENT DOCUMENTS

WO   2017203534 A1   11/2017
WO   2018104929 A1   6/2018

OTHER PUBLICATIONS

International Search Report for International Application No. PCT/US2020/050756 dated Feb. 5, 2021.
(Continued)

*Primary Examiner* — Chuong T Ho

(74) *Attorney, Agent, or Firm* — McBee Moore & Vanik IP, LLC

(57) ABSTRACT

A reliable high-throughput data transmission may be accomplished using a multi-path message distribution and a message reassembly with a forward error correction protection. An incoming flow of data from a source is received at an input parser. The incoming flow of data is divided into a plurality of packets by the input parser. The plurality of the packets is encoded with a FEC and transmitted over a network with a plurality of transmission links. The transmitted plurality of FEC encoded packets are decoded. The decoded plurality of packets is merged to an outgoing flow of data with an output multiplexor and the outgoing flow of data is sent to a destination.

17 Claims, 12 Drawing Sheets

(51) Int. Cl.
  *H04L 29/08* (2006.01)
  *H04L 1/00* (2006.01)
(58) Field of Classification Search
  CPC ....... H04L 47/10; H04L 49/351; H04L 45/16;
   H04L 12/185; H04L 12/18
  USPC .................................................. 370/389, 392
  See application file for complete search history.

(56) References Cited

U.S. PATENT DOCUMENTS

| | | | |
|---|---|---|---|
| 8,560,634 | B2 | 10/2013 | Twitchell, Jr. |
| 9,065,699 | B2 | 6/2015 | Stratigos, Jr. |
| 9,112,758 | B2 | 8/2015 | Niu et al. |
| 9,167,025 | B2 | 10/2015 | Twitchell |
| 9,241,025 | B2 | 1/2016 | Twitchell |
| 9,241,026 | B2 | 1/2016 | Twitchell |
| 9,246,980 | B2 | 1/2016 | Twitchell |
| 9,264,125 | B2 | 2/2016 | Moshfeghi |
| 9,495,194 | B1 | 11/2016 | Twitchell, Jr. et al. |
| 9,634,931 | B2 | 4/2017 | Twitchell, Jr. |
| 9,727,367 | B2 | 8/2017 | Twitchell, Jr. |
| 9,893,774 | B2 | 2/2018 | Shattil |
| 10,064,149 | B1 | 8/2018 | Anvari |
| 10,311,002 | B2 | 6/2019 | Kawai et al. |
| 2005/0002416 | A1 | 1/2005 | Belotserkovsky et al. |
| 2008/0112361 | A1 | 5/2008 | Wu |
| 2009/0168773 | A1 | 7/2009 | Crookes et al. |
| 2011/0219279 | A1 | 9/2011 | Abu-Surra et al. |
| 2014/0123101 | A1 | 5/2014 | Kim |
| 2014/0201587 | A1 | 7/2014 | Luby et al. |
| 2014/0307734 | A1* | 10/2014 | Luby ..................... H04L 65/608 370/390 |
| 2014/0376418 | A1 | 12/2014 | Banerjea |
| 2015/0036664 | A1 | 2/2015 | Yuk et al. |
| 2015/0193212 | A1 | 7/2015 | Elias et al. |
| 2016/0134376 | A1 | 5/2016 | Mateosky et al. |
| 2016/0227396 | A1 | 8/2016 | Lee et al. |
| 2016/0337076 | A1* | 11/2016 | Hwang ................. H04L 1/0045 |
| 2016/0344408 | A1 | 11/2016 | Hwang et al. |
| 2017/0126260 | A1 | 5/2017 | Torbatian et al. |
| 2017/0367277 | A1 | 12/2017 | Mohindra |
| 2019/0280910 | A1* | 9/2019 | Sun ....................... H04L 5/0008 |
| 2020/0228492 | A1* | 7/2020 | Kucera .................. H04L 45/24 |
| 2020/0259589 | A1* | 8/2020 | Bae ....................... H04L 1/0041 |

OTHER PUBLICATIONS

Zilberman, Noa, Gabi Bracha, and Golan Schzukin, "Stardust: Divide and conquer in the data center network," 16th {USENIX} Symposium on Networked Systems Design and Implementation ({NSDI} 19), Feb. 26-28, 2019.

Donald Firesmith, "Virtualization via Containers," Carnegie Mellow University: Software Engineering Institute, Sep. 25, 2017, https://insights.sei.cmu.edu/sei_blog/2017/09/virtualization-via-containers.html.

"What is Hardware Virtualization?" VirtualizationSoftwares.com, virtualizationsoftwares.com/what-is-hardware-virtualization/ (last visited Mar. 12, 2021).

International Search Report and Written Opinion of International Patent Application No. PCT/US18/38397 dated Jul. 27, 2018.

* cited by examiner

MULTI-PATH MESSAGE DISTRIBUTION AND MESSAGE REASSEMBLY FOR LARGE DATA FLOW USING FORWARD ERROR CORRECTION WITH HIGH-PERFORMANCE COMPUTING (HPC)

CROSS-REFERENCE TO RELATED APPLICATIONS

This patent application claims the benefit of U.S. Provisional Patent Application No. 62/900,886, filed 16 Sep. 2019. The disclosure of the priority application is incorporated in its entirety herein by reference.

TECHNICAL FIELD

This disclosure relates to network communication, and more particularly to multi-path message distribution and message reassembly for large data using forward error correction with a high-performance computing.

BACKGROUND

The objective of this method is to provide a reliable high-throughput data transmission for a user network data flow that may be accomplished using a plurality of transmissions paths and utilizing Forward Error Correction (FEC). While a single data flow may be supported via a single transmission path, user network data may be spread over a plurality of transmission paths for multiple reasons. First, the user data may be sent over parallel paths to widen the transmission path for higher throughput. Second, the data may be sent in a redundant fashion, where the data is repeated, e.g. to replicate the data should a packet be lost on one of the transmission paths. Third, on relatively balanced or similar latency transmission paths, data may be retransmitted if lost during transmit on any one transmission path. The techniques previously described demonstrate prior art, to provide a reliable transmission path, but only if there are no high-latency paths that require retransmission of the lost data on the high-latency path, such as a satellite transmission path.

In addition to the described techniques, another well know mechanism for recovering lost or damaged packets is to utilize FEC, where additional parity bits are added to the data flow to recover or reconstruct lost data in a lossy data stream, without the need to have the data retransmitted by the sender.

None of the previously described techniques alone are novel, and the ability to apply of these techniques may be limited to providing reliable data delivery for many flows for non-real-time data.

SUMMARY

The invention herein is directed as a system and method supporting single or limited network user data flows, where there is a single or limited number of high-data rate user network data flows being supported from the source to the destination. In the prior art, the described method works, since there is an assumption that there are many user network data flows being supported and all are low rate, non-real-time data from the source to the destination. However, the prior art cannot support high-data rate network flows in real-time and when one or multiple paths are high-latency transmission links. The described method is supported by a High-Performance Computing (HPC) environment and provides a novel approach to utilize the described invention to provide extremely high-data rate where the network data flows operate at extremely high data rates resulting in nearly "line rate" operation over all links (transmission paths) to ensure reliable transmission of data in real-time. Using the HPC to provide the additional compute power necessary for the introduction of the FEC on each of the flows, a transmission path with adequate data integrity can be accommodated to ensure that at the destination end, data can be received, re-sequenced, corrected (recreated) without the need to have data retransmitted as is required in the prior art. Using the advanced processing technology, these techniques may be accomplished in near real-time using a high-level coding language such as OpenCL or C (a high-level language) to implement the FEC functionality as a x86 based software application running on a High-Performance Computing platform. The system and method described leverages the ability to receive a single or limited number of high-data rate flow(s) and the application of FEC using the heterogenous compute environments to apply the FEC parity bits to each flow. The method defines the reception of multiple flows at the destination HPC to perform the combining and reconstruction of the flow(s), as well as, the recovery of any missing data at the destination network.

An additional function that may be performed by the source and destination application would be to encrypt the user network data prior to the introduction of FEC for added security.

And additional function that may be performed by the source and destination application would be to add dummy data at the source for obfuscation of the beginning and end of a user data traffic. The dummy data is removed at the destination, so the obfuscation data does not egress for the destination user network data flow. The dummy data inserted would also be FEC encoded and scrambled along with the user data being passed from source to destination using the method and system. Additional dummy data may add additional data for providing additional FEC data to other flows over the plurality of flows.

A heterogenous architecture is comprised of at least one or more processor cores to optimize performance and energy efficiency by appropriating computations matched to the type of processor available. These cores can be, but are not limited to, a general-purpose CPU, Graphics Processing Units (GPU), or Field Programmable Gate Arrays (FPGA's).

It is the objective of this invention to provide a method for providing extremely reliable communications for real-time data, at extremely high data rates, over multiple transmission paths, with the optionality of scrambling and obfuscation of the transport data while utilizing HPC type applications leveraging at least one hardware-based accelerator.

These objectives are accomplished by the various aspects of the invention that uses multiple factors to create a high-speed, reliable, and redundant transmission path while not depending on retransmission of data on any transmission path. The present disclosure covers the steps required to accomplish the transmission of user data while using a high-performance computing (HPC) application.

Figure 1:
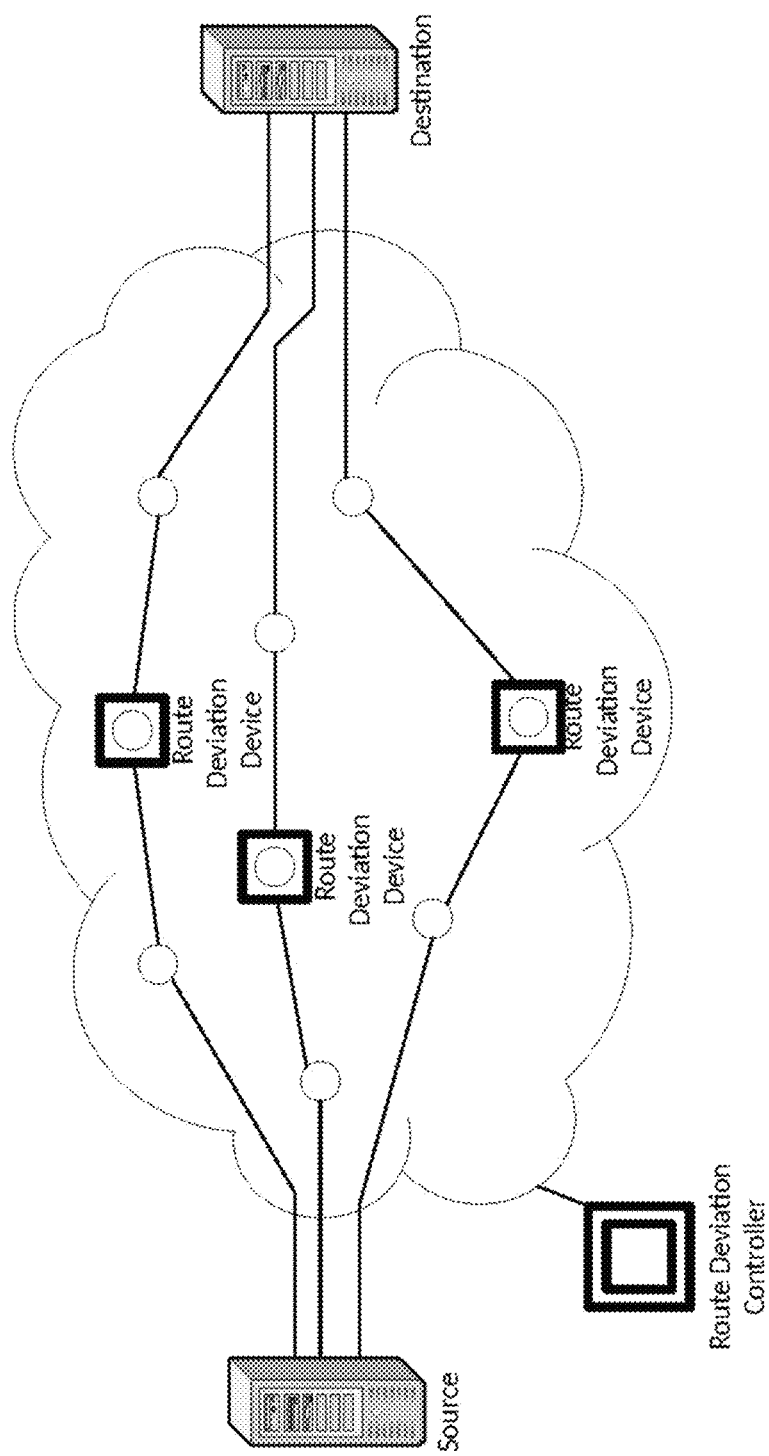
FIG. 1 illustrates the prior art of a particular implementation of using a plurality of links.

At the outset, it should be appreciated that like drawing numbers on different drawing views identify identical structural elements of the invention. It also should be appreciated that figure proportions and angles are not always to scale in order to clearly portray the attributes of the present invention.

DETAILED DESCRIPTION

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims. Although any methods, devices or materials similar or equivalent to those described herein can be used in the practice or testing of the invention, the preferred methods, devices, and materials are now described.

This disclosure, its aspects and implementations, are not limited to the specific processing techniques, components, word/bit widths, or methods disclosed herein. Many additional components and processes known in the art consistent with the modification, manipulation and encryption and decryption of a file or files by a computer program are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

Particular implementations of a method and approach within an HPC architecture of how to provide reliable, high-performance and path diverse transmission is described. However, as will be clear to those of ordinary skill in the art from this disclosure, the principles and aspects disclosed herein may readily be applied to a multitude of transmission paths regardless of the latency and reliability of a given transmission path applications without undue experimentation.

FIG. 1 illustrates the prior art of a particular implementation of using a plurality of links while using re-transmission of data to recover any lost data. The ability to utilize the plurality of links is configured by Route Deviation Controller (RDC) and the selection of the routes is made possible by the Route Deviation Device (RDD) that is placed along the route of the diverse path. The prior art, as shown, performs in an acceptable manner when the user network data is comprised of many user network sessions over plurality of transmission flows, and all data is transported over low-latency, low loss links. In many cases the user network data is non real-time and is transported using a connection-oriented Transmission Control Protocol (TCP). In the prior art, the multitude of flows over low-latency, low loss links with retransmissions being performed over the links operate with minimal issues.

Figure 2:
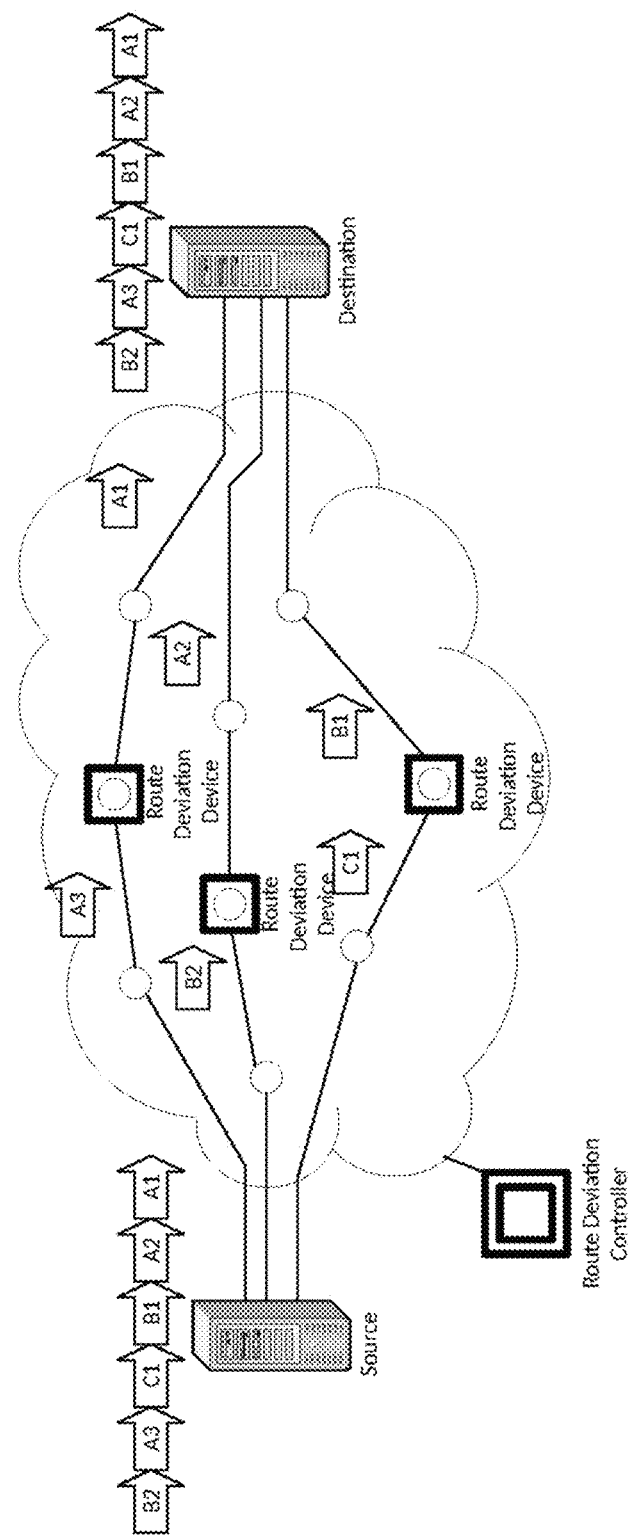
FIG. 2 illustrates the prior art of a particular implementation of using a plurality of links through a Route Deviation devices.
Figure 3:
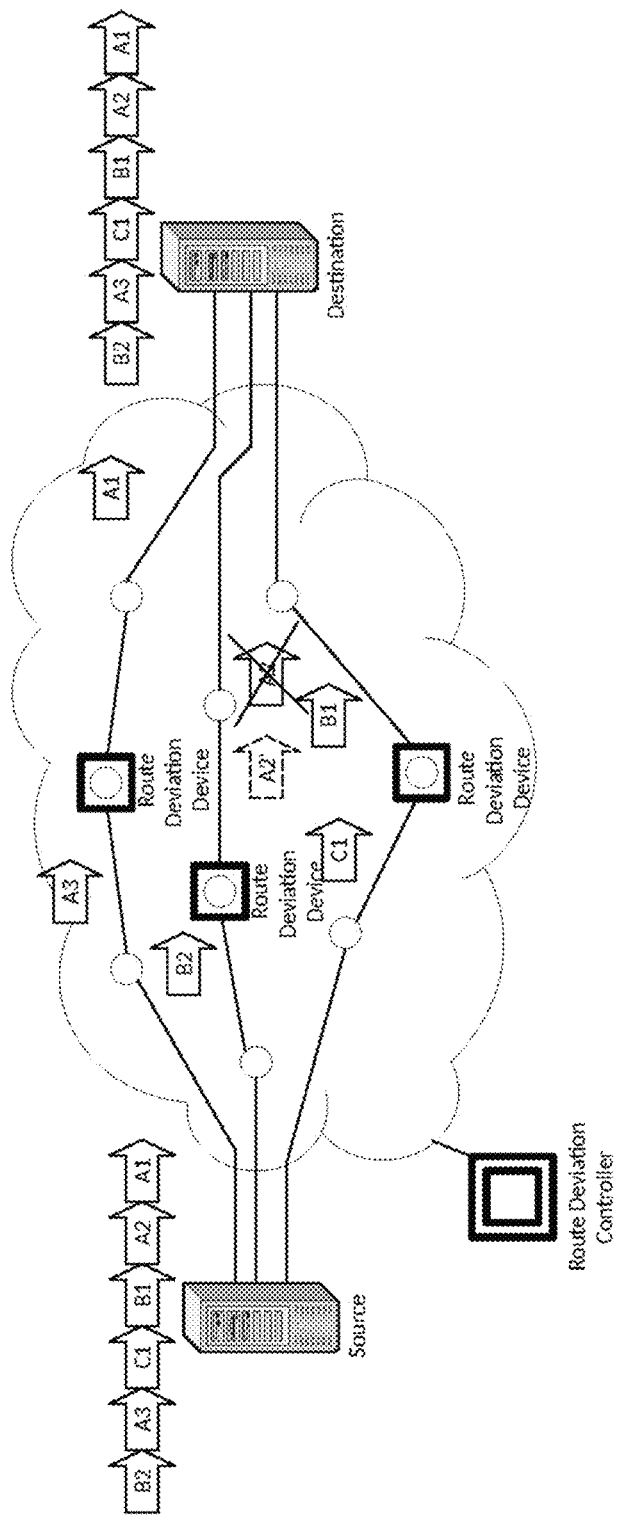
FIG. 3 illustrates an issue with the prior art of a particular implementation of using a plurality of links through the Route Deviation devices.

FIG. 2 illustrates the prior art of a particular implementation of using a plurality of links where multiple flows are spread over multiple low-latency links through the Route Deviation devices FIG. 3 illustrates the prior art of a particular implementation of using a plurality of links where multiple flows are spread over multiple low-latency links, through the Route Deviation devices, where lost data is retransmitted in the event data is lost on a given flow.

Figure 4:
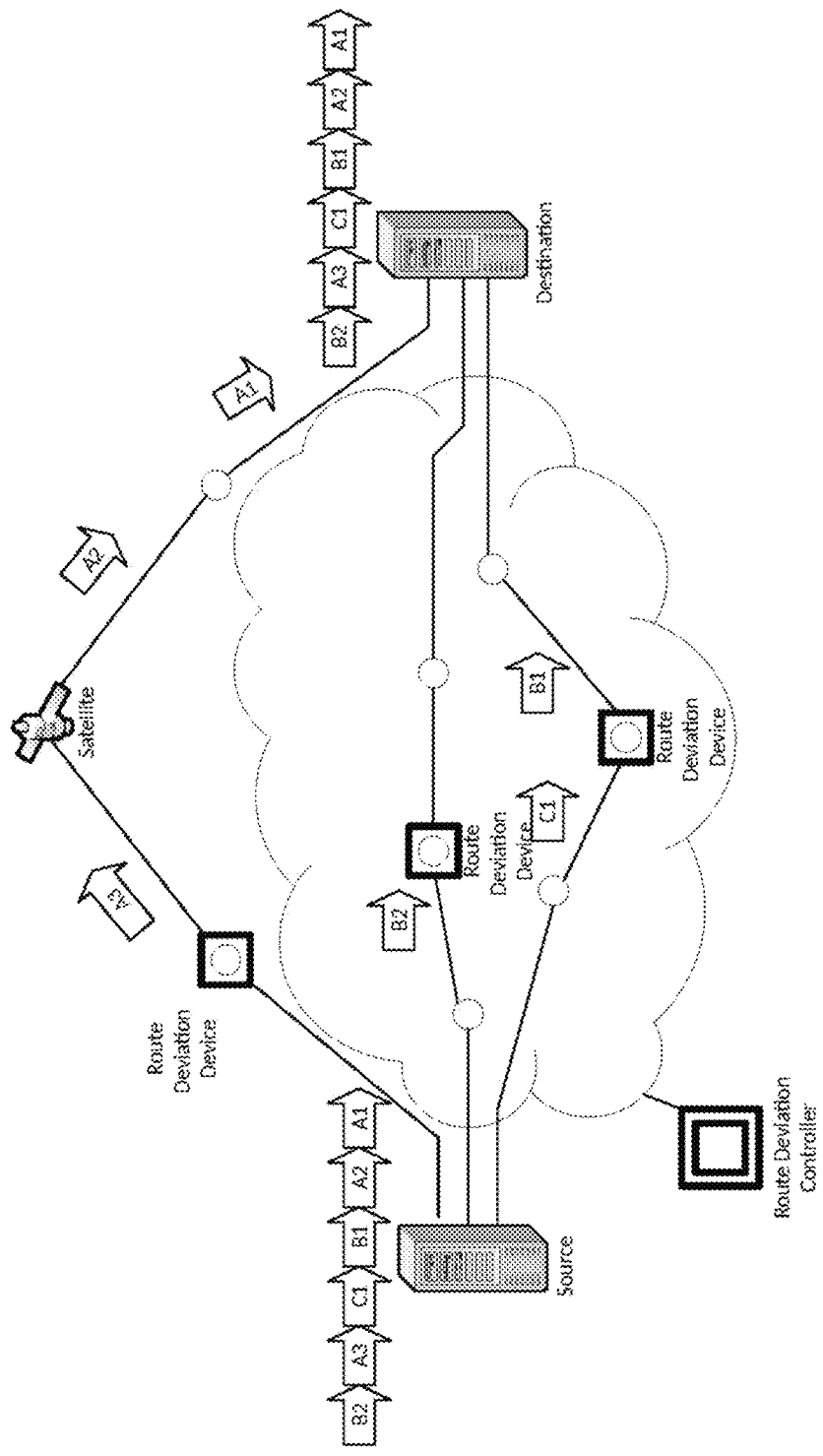
FIG. 4 illustrates the prior art of a particular implementation of using a plurality of links with low and high-latency through the Route Deviation devices.

FIG. 4 illustrates the prior art of a particular implementation of using a plurality of links where the links, through the Route Deviation devices, may be spread over low and high-latency links FIG. 4 demonstrates no loss of data.

Figure 5:
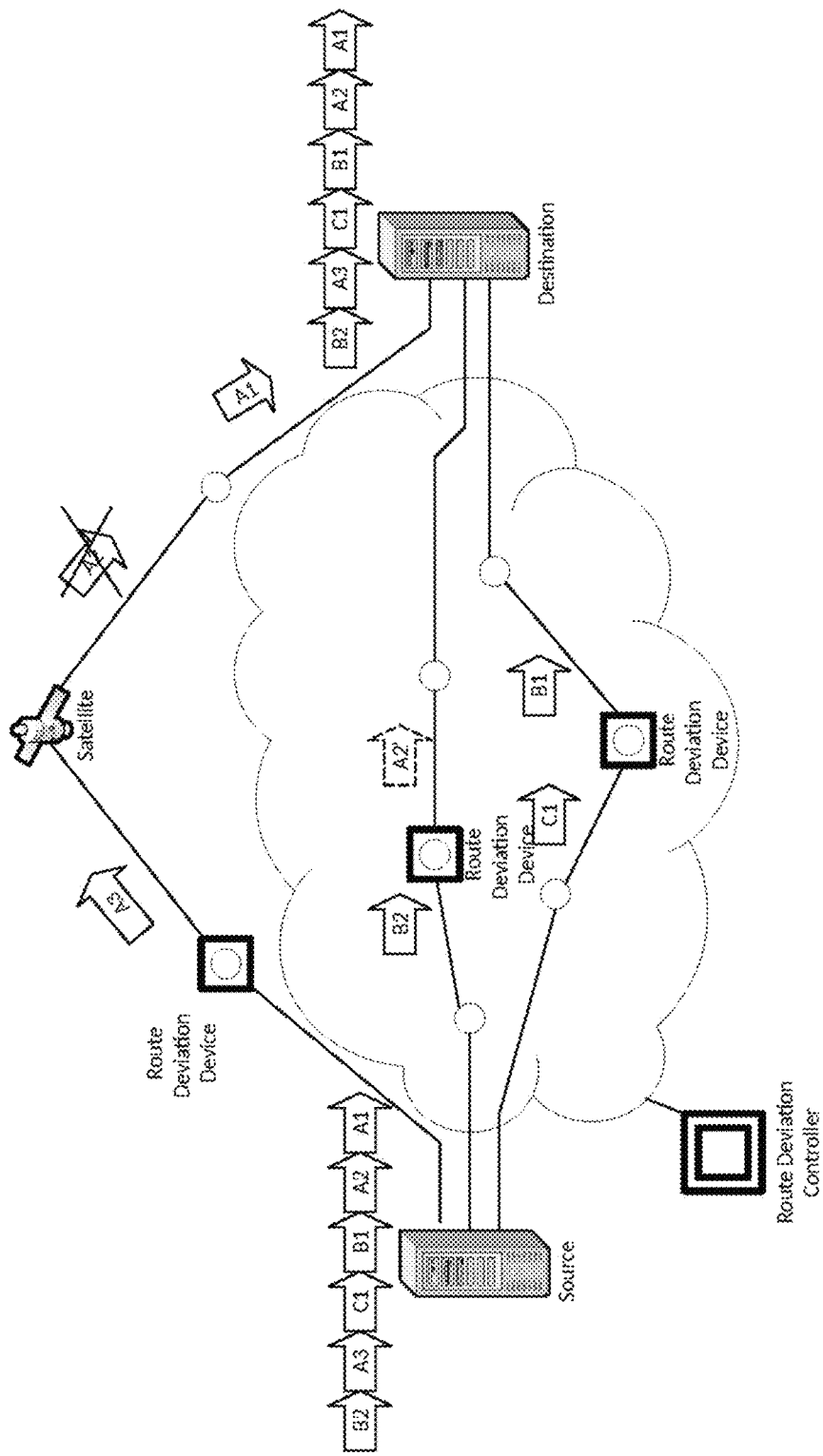
FIG. 5 illustrates an issue with the prior art of a particular implementation of using a plurality of links with low and high-latency the Route Deviation devices.

FIG. 5 illustrates the prior art of a particular implementation of using a plurality of links where the links, through the Route Deviation Devices, may be spread over low and high-latency links where lost data is being retransmitted in the event data is lost on a given flow but only a small or no delay due to the retransmission is realized.

Figure 6:
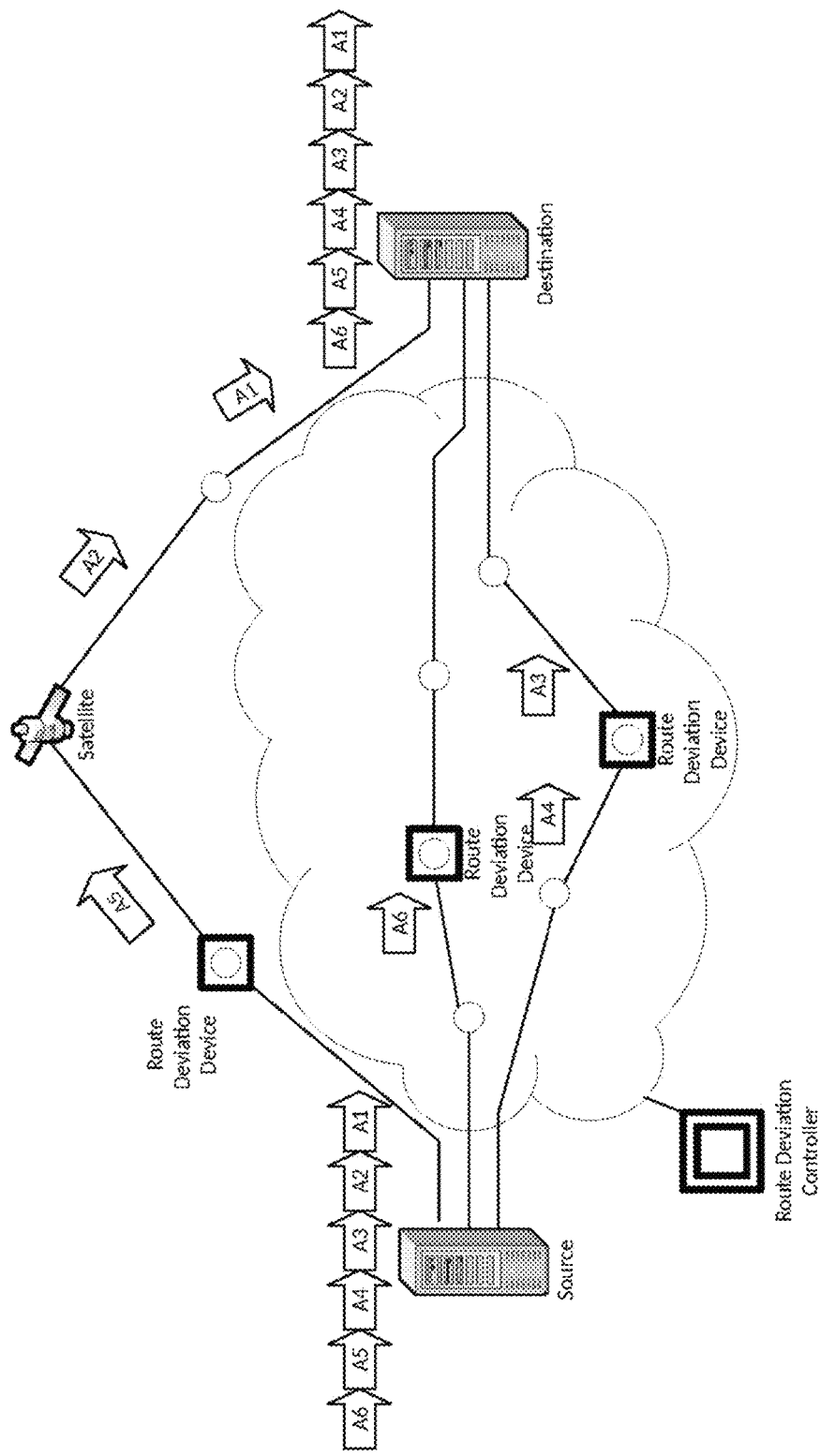
FIG. 6 illustrates the prior art of particular implementation of using a plurality of links with low high-latency and a satellite link.

FIG. 6 illustrates the prior art when carrying a single or limited number of user network data flows, through the Route Deviation Devices where one of the links is a satellite link, and when there is no data loss on a high-latency (satellite) link.

Figure 7:
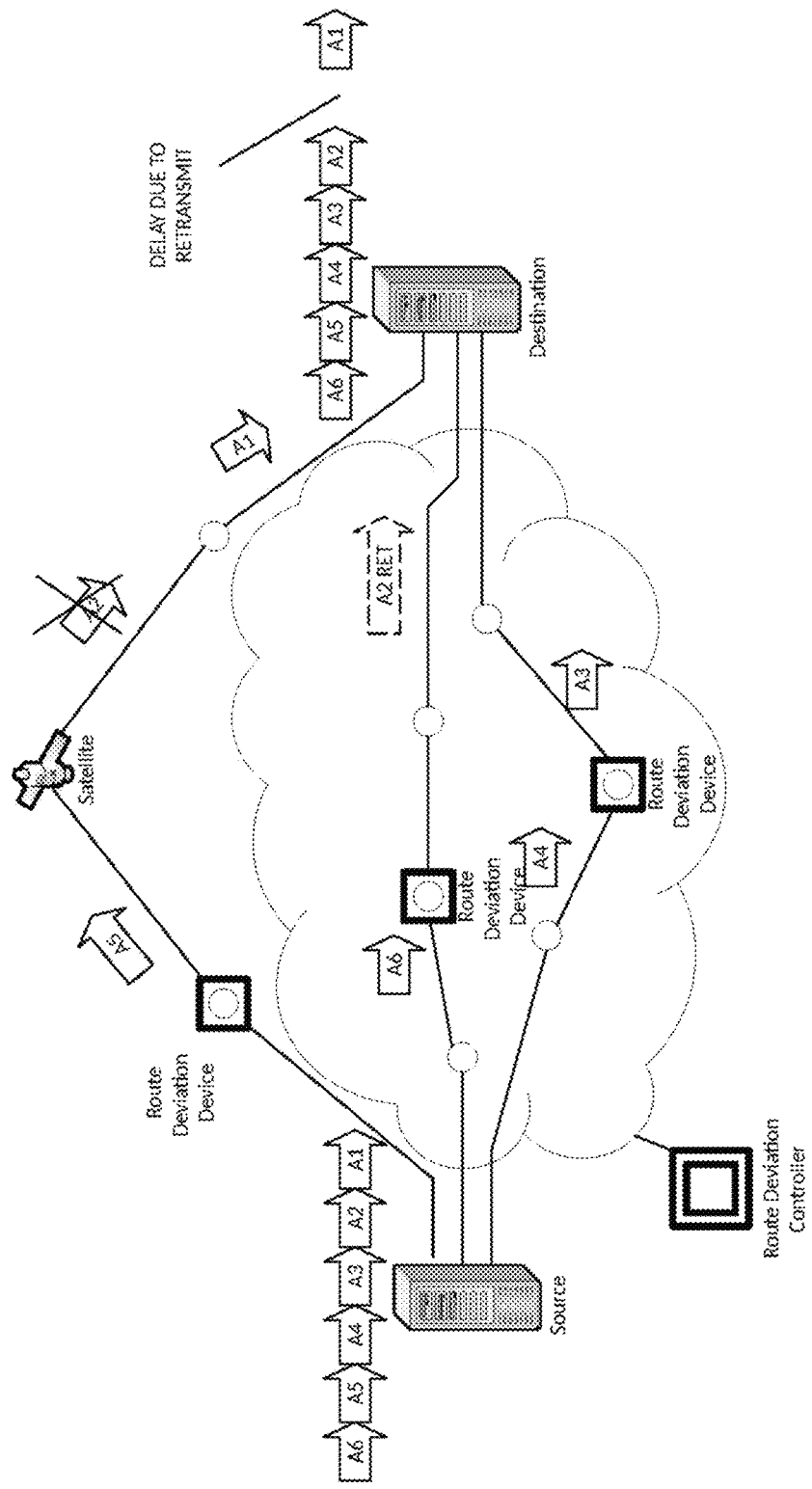
FIG. 7 illustrates an issue with the prior art of particular implementation of using a plurality of links with low high-latency and a satellite link.

FIG. 7 illustrates the issue with the prior art when carrying a single or limited number of high-speed user network data flows, through the Route Deviation Devices where one of the links is a satellite link, and when data loss occurs on a high-latency (satellite) link. The lost data results in the entire transmission path stopping, also known as stalling, and no data will flow to the end point until re-transmission has taken place. Even if a retransmission could be accomplished, the data rate is high enough that a stall is still realized. Therefore, the prior art becomes unusable.

Figure 8:
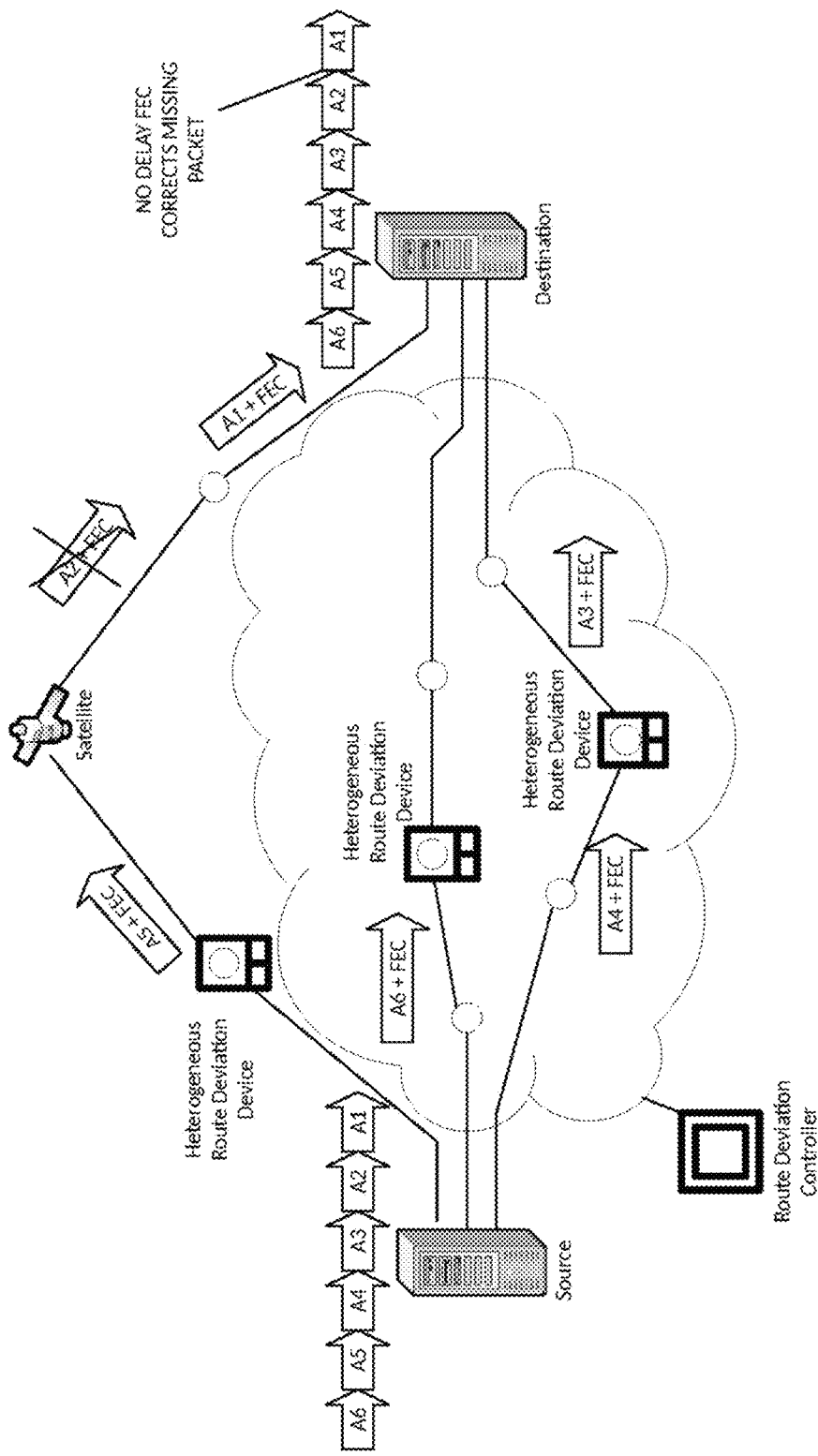
FIG. 8 illustrates a particular implementation of using a plurality of links using a Route Deviation devices in accordance with an implementation of the disclosure.

FIG. 8 illustrates the novelty of the invention where the flows are exactly as show in FIG. 6 and FIG. 7, using a Route Deviation Controller, but instead of relying on the fact that there are many user network data flows along with retransmission, the described invention may support both many low data-rate user network flows as well as one or a limited user data flow with FEC to overcome the stalling. In FIG. 8 packet A2 is lost or corrupted over a high-latency satellite link Instead of retransmission of packet A2, A2 is recovered by FEC, resulting no delay or a missing packet. To accomplish this, a Heterogenous (High-Performance Computing) Route Deviation Device (HRDD) with adequate compute power is required. The described invention brings to bear the fact that the described method is supported with the aid of the HPC technology via a high-level user application. The novelty of the invention is possible only with the HRDD's combined computing power of the CPU and hardware assisted processor.

Figure 9:
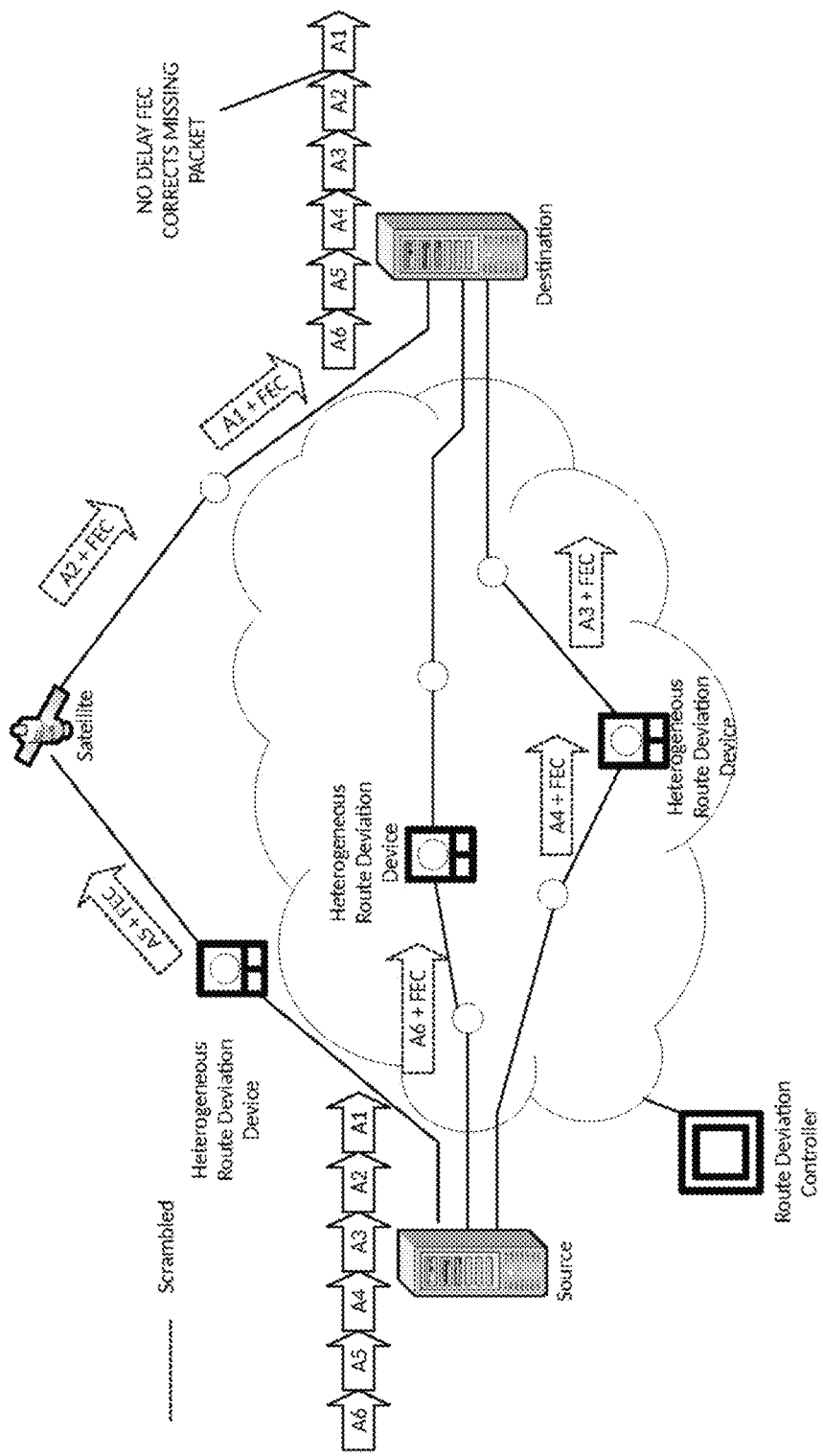
FIG. 9 illustrates an alternate embodiment with data scrambled prior to transmission and the addition of FEC in accordance with an implementation of the disclosure.

FIG. 9 illustrates an alternate embodiment where the user network data may be scrambled prior to transmission and the addition of FEC in accordance of an implementation of the disclosure. The source adds the scrambling and the destination removes the scrambling prior to egress as a user network data flow. The described invention brings to bear the fact that the described method is supported with the aid of the HPC technology via a high-level user application. The novelty of the invention is possible only with the HRDD's combined computing power of the CPU and hardware assisted processor.

Figure 10:
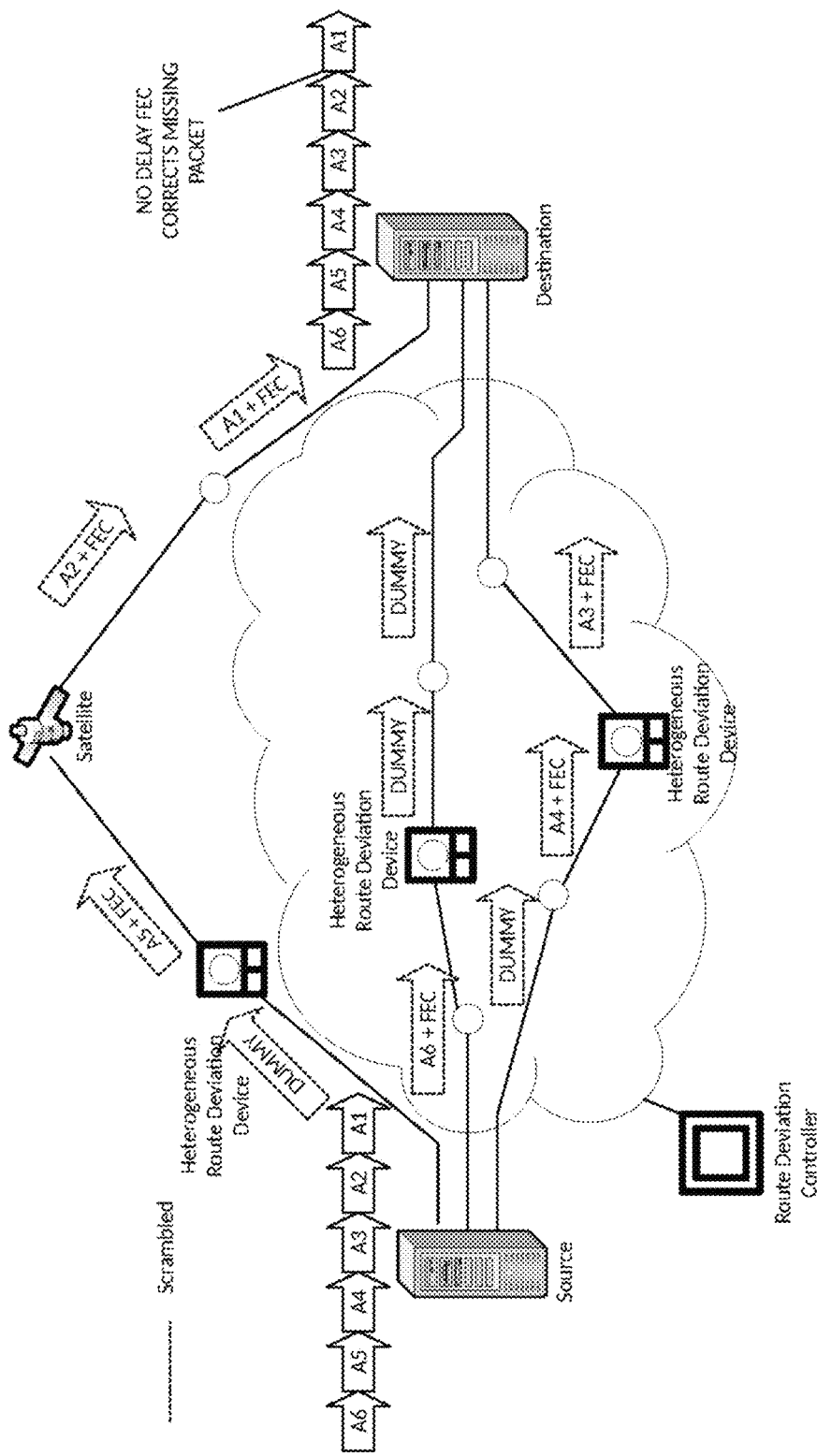
FIG. 10 illustrates an alternate embodiment with dummy data added prior to transmission, FEC and scrambling in accordance with an implementation of the disclosure.

FIG. 10 illustrates an alternate embodiment where the user network data may have dummy data added prior to transmission, as well as, the addition of FEC and/or scrambling. The source adds the dummy packets and the destination removes the dummy prior to egress as a user network data flow. The described invention brings to bear the fact that the described method is supported with the aid of the HPC technology via a high-level user application. The novelty of the invention is possible only with the HRDD's combined computing power of the CPU and hardware assisted processor.

Figure 11:
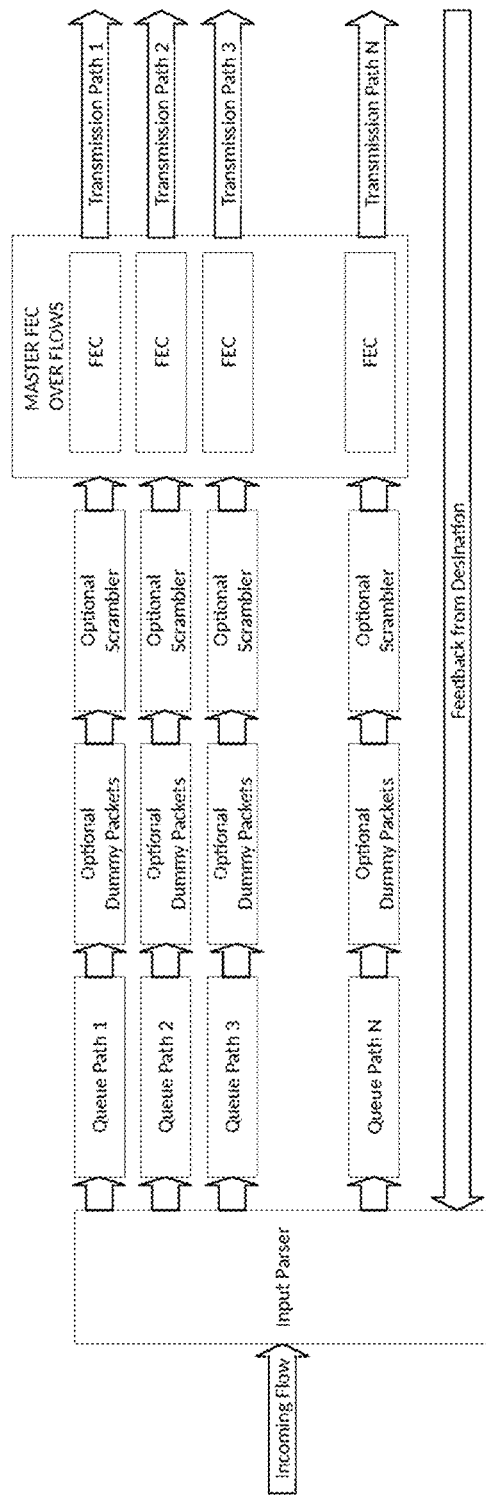
FIG. 11 illustrates data flow paths of a source in accordance with an implementation of the disclosure.

FIG. 11 illustrates an ingress of user network data flows into the described invention and creation of the queues (flows) for each path. The combined flows demonstrate that dummy and scrambler data may be added and then FEC passed over each of the flows in full or in part to the transmission path flows. In an implementation, an incoming flow of data from a source is received at an input parser. The incoming flow data is a single stream of data and is divided into a plurality of packets with a plurality of data flow paths. The plurality of packets is passed to a master FEC, which encodes the plurality of packets and generate a FEC encoded plurality of packets. Then, the FEC encoded plurality of packets are transmitted to a network with a plurality of transmission links In another implementation, dummy data may appended to the plurality of the packets or the plurality of the packets may be scrambled prior to the FEC encoding. In another implementation, both dummy data and scramble may be applied to the plurality of the packets prior to the FEC encoding.

Figure 12:
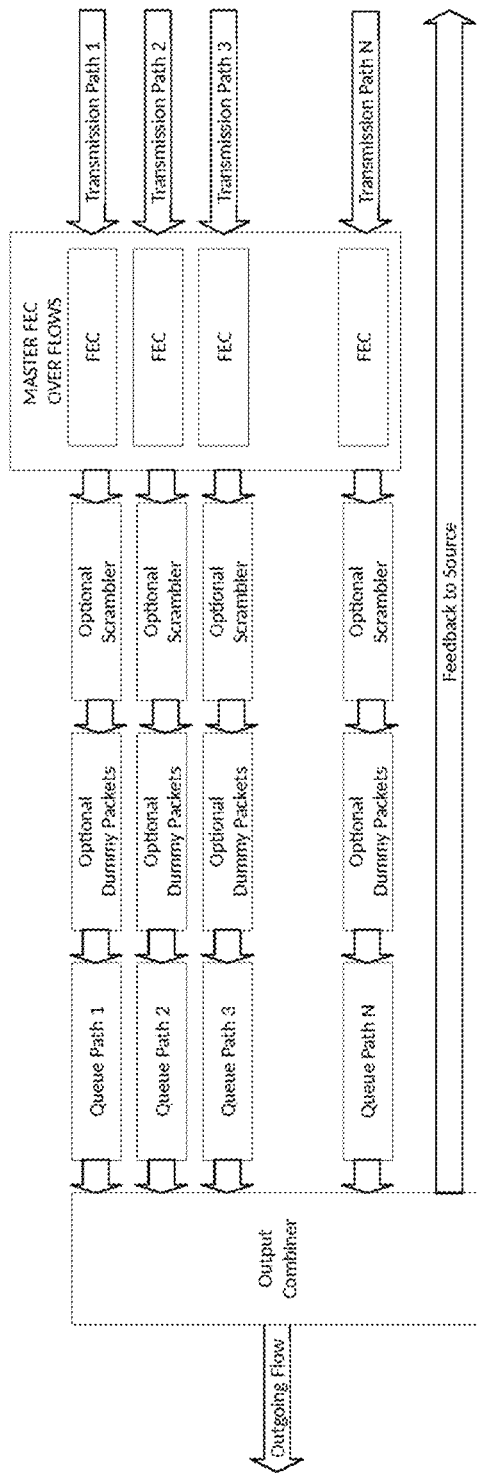
FIG. 12 illustrates data flow paths of a destination in accordance with an implementation of the disclosure.

FIG. 12 illustrates an ingress of the transmission path flows where the FEC is decoded on a single or multiple flows to receive and recreate each of the flows and then optionally unscrambled and/or optionally dummy packets removed, and then placed in the input queue for resequencing and egressed as the reconstructed user network data flow. The FEC encoded plurality of packets in FIG. 11 is transmitted over a network via a plurality of the transmission links and is received at a master FEC, which decodes the encoded plurality of packets into a plurality of packets. The plurality of packets is, then, passed to an output combiner and is combined to an outgoing flow of data to a destination.

In an implementation, the plurality of packet may be de-scrambled and/or dummy data may be removed from the plurality of packets.

In the preferred embodiment, the described invention utilizes a high-performance computing HPC PC or server with at least one CPU and a hardware acceleration device and utilizing a high-level coding language platform to perform the method as an application. The HPC receives one or more user network data flows that is further broken into a plurality of flows, where each flow must pass through an a priori HPC-based Heterogenous Route Deviation Device (HRDD) and where each data flow is an independent flow from the source towards the destination. For each path available between the source and destination, a separate flow is created. The data flow is established as flow that is assumed to be lossless with a configured estimate or "assumed" data rate that may be achievable over the transmission path. Each of the data flows are established prior to transmission. Upon runtime, each flow is then monitored with return data from the remote end to determine the available data rate that is received. During run time, the received data rate on each flow is then monitored and data rates are adjusted across each of the flows to ensure no one data flow is being overrun. In the preferred embodiment, each flow has FEC applied on each path that allows up to an entire flow to be lost before lost data becomes unrecoverable at the destination. The FEC is applied to ensure that data may be recovered at the destination end and metrics are then provided from the receiving end to notify the source of the performance of each link, e.g. how much traffic is flowing through the link and if the particular link is losing data or is underutilized. The method allows for dynamic adjustment of the flows to ebb and flow the assignment of data in the event a given link is performing poorly or being underutilized. Unlike the prior art, no data is required to be duplicated or retransmitted, but instead FEC data is used to recover lost, missing, or damaged data; however, only the performance of the Heterogeneous Route Deviation Device based on the HPC can achieve the real-time performance of applying FEC at line rates. Both the source and destination monitoring devices performing the operation in the preferred embodiment is achieved using the HPC as a heterogeneous application process on both ends of the link In an alternate embodiment, the FEC may be reduced as the network performance increases (for example, lower loss/latency) but can or should never be completely disabled.

The use of FEC accelerated by the HPC in the preferred embodiment preserves the real-time nature of the user data network.

The novelty of the invention is there is no requirement of the user network traffic to account for lost data, so that both Transmission Control Protocol (TCP) a connection-oriented protocol as well as a User Datagram Protocol (UDP) a connectionless protocol can be equally supported with equal end-to-end performance.

In an alternate embodiment, the data passed over each flow may be scrambled before or after the FEC by the source and passed over the transmission network and the scrambling removed by the destination. The scrambling may be performed by a fixed scrambling scheme with a priori notification of a scrambling polynomial or via a dynamic key rolling scheme that is time, control channel triggered, or reset by machine or human intervention. Through the use of the HPC, the real-time nature of the user network data flow maintained by the FEC and scrambling process.

In an alternate embodiment, the data passed over each flow may have dummy data (non-user network data) before or after the FEC and scrambling by the source and passed over the transmission network. The dummy data is removed by the destination. The addition of the dummy data may be performed by adding fixed, time varying, or random sized data packets via a number of packets, time, control channel triggered, or configured by machine or human intervention. Through the use of the HPC, the real-time nature of the user network data flow is not interrupted by the dummy data process.

A back flow (return channel) may be provided from the receiving end to provide back channel information to instruct the sender as to how well the links are performing in part (each link), in whole (all links), the data rates on each link and FEC may be adjusted to optimize the links for optimal bandwidth utilization.

The following are particular implementations with the HPC application multi-transmission path scheme, and the use of these methods are provided as non-limiting examples.

1. A user desires to send user data from a source location to a remote location using a single user data flow of high-speed real-time waveform data that may not be delayed or experience any packet loss. In this non-limiting example, the Route Deviation Controller (RDC) is utilized to establish multiple paths through a plurality of links each containing a Heterogenous Route Deviation Device (HRDD) where there is one satellite transmission path with a latency of 0.325 seconds, two optical connections with a latency of 0.025 second and a microwave connection with a latency of 0.05 seconds. Using the described method, the single incoming flow is then separated into four transmission links, FEC is applied across all four links, and a packet is lost on the satellite link Using the described method with the HRDD, a lost packet on the satellite link is corrected by the reception of the packets received prior to and after the lost packet, as well as the FEC on the other links carrying data on the other transmission paths.

2. A user desires to send user data from a source location to a remote location using a single user data flow of high-speed real-time waveform data that cannot tolerate excessive delay or any packet loss. In this non-limiting example, the Route Deviation Controller (RDC) is utilized to establish multiple paths through many links each containing a Heterogenous Route Deviation Device (HRDD) where there is a one satellite transmission path with a latency of 0.325 seconds, two optical connections with a latency of 0.025 second and a microwave connection with a latency of 0.05 seconds. Using the described method, the single incoming flow is then separated into four transmission links, FEC is applied across all four links, and a packet is lost on the satellite link Using the described method, the microwave transmission link is lost resulting in one quarter of all the data being lost on the microwave link Using the FEC spread over the remaining three links, on the other transmission paths the entire data is reconstructed without having to be retransmitted.

3. A user desires to send user data from a source location to a remote location using a single user data flow of high-speed real-time waveform data that may not be delayed or experience any packet loss. In this non-limiting example, the Route Deviation Controller (RDC) is utilized to establish multiple paths through many links each containing a Heterogenous Route Deviation Device (HRDD) where there are four satellite transmission paths, each with a latency of 0.325 seconds. Using the described method, the single incoming flow is then separated into four transmission links, FEC is applied across all four links, and a packet is lost on the satellite link Using the described method, a lost packet on the satellite link is corrected by the reception of the packets received prior to and after the lost packet, as well as, the FEC on the other links carrying data on the other transmission paths.

4. A user desires to send user data from a source location to a destination location using a single user data flow of high-speed real-time data that cannot tolerate excessive delay or any packet loss. In this non-limiting example, the Route Deviation Controller (RDC) is utilized to establish multiple paths through many links each containing a Heterogenous Route Deviation Device (HRDD) where there are four satellite transmission paths with a latency of 0.325 seconds. Using the described method, the single incoming flow is then separated into four transmission links, FEC and scrambling of all data is applied across all four links, and a packet is lost on the satellite link Using the described method, a lost packet on the satellite link is corrected by the reception of the packets received prior to and after the lost packet, as well as, the FEC on the other links carrying data on the other transmission paths. The scrambling of all data would be removed prior to egress to the user network data. As a result of scrambling, an "observer in the middle" of any one flow would see data that the data is unusable due to being scrambled.

5. A user desires to send user data from a source location to a destination location using a single user data flow of high-speed real-time data that may not be delayed or experience any packet loss. In this non-limiting example, the Route Deviation Controller (RDC) is utilized to establish multiple paths through many links each containing a Heterogenous Route Deviation Device (HRDD) where there are four satellite transmission paths with a latency of 0.325 seconds. Using the described method, the single incoming flow is then separated into four transmission links, FEC and scrambling of all data is applied on across all four links and dummy data is introduced, and a packet is lost on the satellite link. Using the described method, a lost packet on the satellite link is corrected by the reception of the packets received prior to and after the lost packet, as well as, the FEC on the other links carrying data on the other transmission paths. The scrambling of all data would be removed, and dummy data is removed prior to egress to the user network data. As a result of scrambling, an "observer in the middle" of any one flow would see data that is unusable due to being scrambled. The dummy data insertion prevents traffic analysis by the "observer in the middle" to determine the start and stop of actual user data.

6. A user desires to send user data from a source location to a destination location using a single user data flow of high-speed real-time data that may not be delayed or experience any packet loss. In this non-limiting example, the Route Deviation Controller (RDC) is utilized to establish multiple paths through many links each containing a Heterogenous Route Deviation Device (HRDD) where there are four satellite transmission paths with a latency of 0.325 seconds. Using the described method, the single incoming flow is then separated into four transmission links, FEC and scrambling of all data is applied on across all four links and dummy data is introduced, and a packet is lost on the satellite link Using the described method, a lost packet on the satellite link is corrected by the reception of the packets received prior to and after the lost packet, as well as, the FEC on the other links carrying data on the other transmission paths. The scrambling of all data would be removed, and dummy data is removed prior to egress to the user network data. During the operation of the transmission of data, the receiving end (implementing the receiving method) provides feedback to the sender end (implementing the sending method) to increase the bandwidth on the non-satellite link as well as increase the level of FEC on the satellite link due to high-packet errors.

The invention claimed is:

1. A high-performance computer (HPC) implemented method for a multi-path data flow with a forward error correction (FEC) protection, the method comprising the steps of:
    receiving an incoming flow of data at an input parser,
        wherein the incoming flow of data is a single stream of data sent from a source;
    dividing the incoming flow of data into a first plurality of packets via the input parser;
    passing the first plurality of packets to a first master FEC to generate a plurality of FEC encoded packets;
    transmitting the plurality of FEC encoded packets to a second master FEC via a network with a plurality of transmission links;
    receiving the plurality of FEC encoded packets at the second master FEC,
        wherein the second master FEC decodes the plurality of FEC encoded packets and generates a second plurality of packets; and
    passing the second plurality of packets to an output combiner,
        wherein the output combiner merges the second plurality of packets into an outgoing flow of data in a correct sequence, and wherein the outgoing flow of data is received at a destination, and
        wherein the method further comprises scrambling the first plurality of the packets; and de-scrambling the second plurality of the packets.

2. The HPC implemented method of claim 1, further comprising: appending dummy data to the first plurality of the packets; and removing the dummy data from the second plurality of the packets.

3. The HPC implemented method of claim 2, further comprising: scrambling the first plurality of the packets; and de-scrambling the second plurality of the packets.

4. The HPC implemented method of claim 1, wherein the network comprises at least one of a low latency transmission link or a high latency transmission link.

5. The HPC implemented method of claim 1, wherein each transmission link of the plurality of transmission links is operatively coupled to a heterogenous deviation device.

6. The HPC implemented method of claim 1, wherein scrambling is performed via a fixed scrambling scheme with a priori notification of a scrambling polynomial or via a dynamic key rolling scheme.

7. The HPC implemented method of claim 1, wherein a level of FEC encoding is reduced in response to an increase of the network performance.

8. A system for providing a multi-path data flow with forward error correction (FEC) protection, the system comprising:
    a route deviation controller (RDC);
    a plurality of heterogenous route deviation devices (HRDD), wherein each HRDD is implemented via a high performance computer;
    a network comprising a plurality of transmission links; and
    a high level coding language platform running on the high performance computer, wherein the high level coding language platform is configured to perform:
    encoding a first plurality of packets to a plurality of FEC encoded packets;
    transmitting the plurality of FEC encoded packets; and
    decoding the plurality of FEC packets to a second plurality of packets,
        wherein the high level coding language platform is further configure to perform scrambling the first plurality of the packets and de-scrambling the second plurality of the packets.

9. The system of the claim 8, wherein the high level coding language platform is further configure to perform appending dummy data to the first plurality of the packets and removing the dummy data from the second plurality of the packets.

10. The system of the claim 9, wherein the high level coding language platform is further configure to perform scrambling the first plurality of the packets and de-scrambling the second plurality of the packets.

11. The system of the claim 8, wherein the high performance computer comprises at least one processor and a hardware acceleration device.

12. The system of the claim 8, wherein the each transmission link of the plurality of transmission links is operatively coupled to each HRDD of the plurality of HRDDs.

13. The system of the claim 11, wherein the processor comprises at least one or more cores, and wherein the cores comprise at least one of a general purpose central processing unit, a graphic processing unit, or a field programmable gate arrays.

14. A non-transitory computer readable storage medium storing instructions that when executed by a processing device, cause the processing device to:
    receive an incoming flow of data at an input parser,
        wherein the incoming flow of data is a single stream of data sent via a source;
    divide the incoming flow of data into a first plurality of packets via the input parser;
    pass the first plurality of packets to a first master FEC to generate a plurality of FEC encoded packets;
    transmit the plurality of FEC encoded packets to a second master FEC via a network with a plurality of transmission links;
    receive the plurality of FEC encoded packets at the second master FEC, wherein the second master FEC decodes the plurality of FEC encoded packets and generates a second plurality of packets; and pass the second plurality of packets to an output combiner, wherein the output combiner merges the second plurality of packets into an outgoing flow of data in a correct sequence, and wherein the outgoing flow of data is received at a destination, wherein non-transitory computer readable storage medium storing instructions further comprises instructions that when executed by the processing device, cause the processing device scramble the first plurality of the packets and de-scramble the second plurality of the packets.

15. The non-transitory computer-readable storage medium of claim 14, comprising further instructions that when executed by the processing device, cause the processing device to append dummy data to the first plurality of packets and remove dummy data from the second plurality of packets.

16. The non-transitory computer-readable storage medium of claim 15, comprising further instructions that when executed by the processing device, cause the processing device to scramble the first plurality of the packets and de-scramble the second plurality of the packets.

17. The non-transitory computer-readable storage medium of claim 14, wherein the network comprises at least one of a low-latency transmission link or a high-latency transmission link.

\* \* \* \* \*